(No Model.)  2 Sheets—Sheet 1.
J. E. GOODHUE.
POWER TRANSFORMER.
No. 563,955. Patented July 14, 1896.
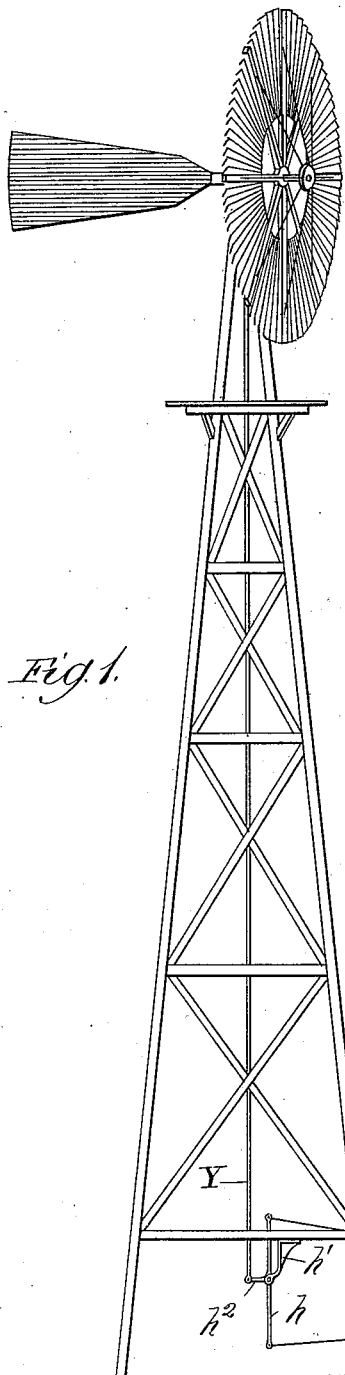
Fig. 1.
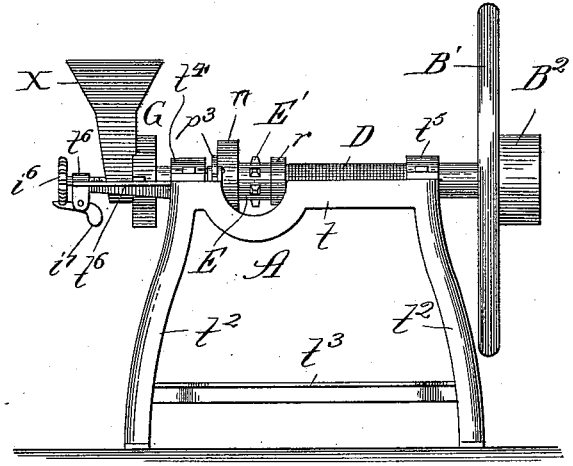
Fig. 2.
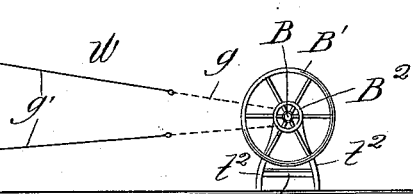
Witnesses:
Inventor:
James E. Goodhue,
By Dyrenforth & Dyrenforth
Attys.

(No Model.) 2 Sheets—Sheet 2.
J. E. GOODHUE.
POWER TRANSFORMER.
No. 563,955. Patented July 14, 1896.
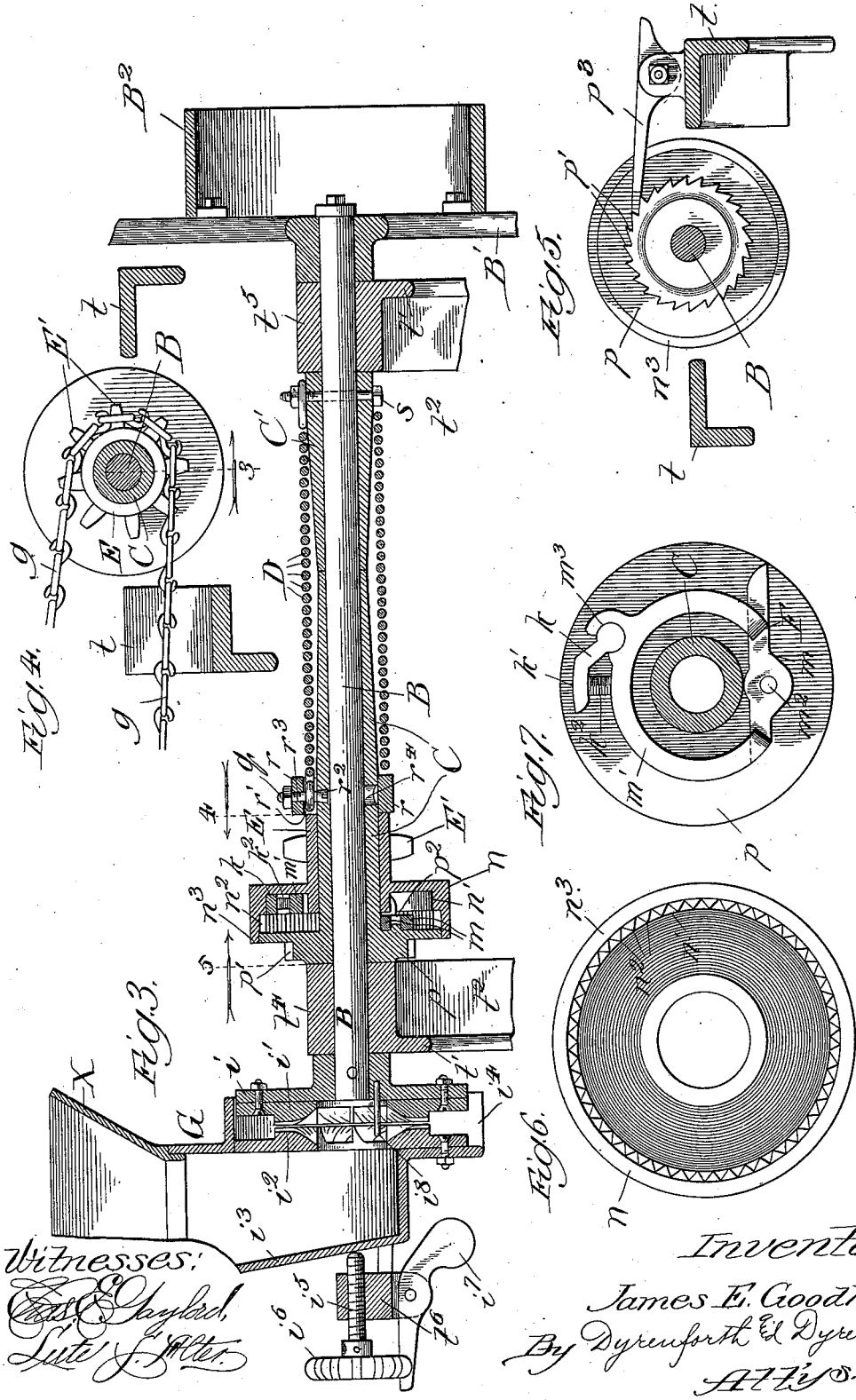
Witnesses:
Inventor:
James E. Goodhue,
By Dyrenforth & Dyrenforth
Attys

UNITED STATES PATENT OFFICE.

JAMES E. GOODHUE, OF ST. CHARLES, ILLINOIS.

POWER-TRANSFORMER.

SPECIFICATION forming part of Letters Patent No. 563,955, dated July 14, 1896.

Application filed March 31, 1896. Serial No. 585,525. (No model.)

*To all whom it may concern:*

Be it known that I, JAMES E. GOODHUE, a citizen of the United States, residing at St. Charles, in the county of Kane and State of Illinois, have invented a new and useful Improvement in Power-Transformers, of which the following is a specification.

My invention relates to an improvement in power-transforming mechanism for use especially in converting a more or less unsteady reciprocating motion into a comparatively steady rotary motion.

My object is, more particularly, to provide a power-transforming device, for farm use, where windmills are employed to pump water, and which, when actuated from the reciprocating pump-rod or plunger, will produce a comparatively steady rotation of a shaft which drives a grinding-mill or any other machine requiring only such power to run it as the windmill can contribute, as, for example, a grindstone or churn.

My invention consists in the general construction of my improved power-transforming mechanism and also in details of construction and combinations of parts, all as hereinafter set forth and claimed.

In the drawings, Figure 1 is a view in the nature of a diagram showing a desirable way of gearing my improved power-transforming machine to the plunger-rod of a windmill; Fig. 2, a view in elevation of the machine as I prefer to provide it; Fig. 3, a broken and enlarged section longitudinally through the machine taken on line 3 of Fig. 4; Figs. 4 and 5, enlarged sections taken, respectively, on lines 4 and 5 of Fig. 3 and viewed in the directions indicated by the arrows; and Figs. 6 and 7, enlarged views of the members of an intermittent grip mechanism.

A is a frame, consisting of side bars $t$, end bars $t'$, legs $t^2$, and an under brace $t^3$, the parts being preferably secured together with bolts. Journaled toward opposite ends, in boxes or bearings $t^4$ $t^5$ on the end bars, is a rotary shaft B. Confined upon the shaft between the bearings $t^4$ $t^5$ are separate abutting sleeves C C'.

D is a helical spring extending around the sleeves and fastened at one end to a bolt $s$, which passes through the sleeve C' and shaft, thus fastening that end of the spring, the sleeve C', and shaft B rigidly together. At the opposite end of the spring D and surrounding the sleeve C is a collar $r$, provided with a recess $r'$ to receive the end of the spring, which is bent to produce an eye. Passing through the said eye and through coincident openings $r^2$ $r^3$ in the sleeve C and collar is a bolt $q$, which fastens that end of the spring to the sleeve C, but not to the shaft. The opening $r^2$ is rendered flaring on the inner side of the sleeve to receive and hold the head of the bolt, and an opening $r^4$ in the opposite side of the sleeve facilitates placing the bolt in position before the sleeve is passed over the shaft. From the points of attachment of the spring to the abutting ends of the sleeves the latter are rendered slightly tapering, as shown, to permit the spring to contract in diameter when set or extended, as hereinafter described.

On the end of the sleeve C, adjacent to the bearing $t^4$, is a head or disk $p$, formed on its outer side with a ratchet $p'$, and provided on its inner side with a pin $p^2$, in the position shown. Between the head $p$ and collar $r$ the sleeve C forms a smooth annular bearing-surface for a sleeve E, provided between its ends with circumferential teeth forming a sprocket-wheel E'. On the sleeve E at the head $p$ is a cup-shaped head $n$, presenting an inner annular friction-surface $n'$, an annular surface adjacent thereto and serrated to present an inner circumferential ratchet $n^2$, and a rim portion $n^3$, which extends loosely around the circumferential face of the disk $p$.

F is a frame forming an intermittent grip-lever and comprising a bar or finger $m$, and an offset ring or segment $m'$. The bar or finger $m$ is provided with an opening $m^2$, at which it is pivotally mounted upon the pin $p^2$, and it forms at its end a pawl to engage the ratchet $n^3$. On the offset-ring portion $m'$ is a bearing $m^3$ for a pivotal friction-finger $k$, having a bearing-surface $k'$. Confined between the bearing finger and surface of the ring $m'$ is a spring $k^2$, which tends to press the finger at its surface $k'$ against the friction-surface $n'$ in the head $n$. Mounted upon one of the side bars $t$ of the frame is a pivotal stop or dog $p^3$, which engages the ratchet $p'$. Beyond the bearing $t^5$ the shaft B carries a fly-wheel B' and pulley B². On the frame, beyond the bearing $t^4$, is a bracket $t^6$. On the adjacent end of the shaft B is a head $i$, carrying one of the disks or grinding members $i'$ of a grinding-mill G. The other grinding disk or member $i^2$ is mounted stationary in a chamber or casing $i^3$, supported in the bracket $t^6$. The chamber or casing $i^3$ has an outlet $i^4$ below the grinding-disks, and at its top is adapted to receive a hopper X. The casing $i^3$ may be adjusted to move the disk or plate $i^2$ toward or away from the disk $i'$ by means of an adjusting-screw $i^5$, passing through the end of the bracket $t^6$ and bearing against the wall of the chamber $i^3$. On the screw $i^5$ is a handle or disk $i^6$, provided with circumferential notches, with which a swinging gravity-pawl $i^7$ engages to lock the screw in adjusted position. On the head or rotary grinding-member support $i$ is a pin or stirrer-finger $i^8$, which projects into the grinding-chamber formed between the grinding members $i'$ $i^2$.

As before stated, my improved machine is intended more especially to be driven from the vertically-reciprocating plunger-rod Y of a windmill, as shown in Fig. 1, and for this purpose I provide a vertically-disposed bar or lever $h$, pivotally connected between its ends to a bracket $h'$ on the windmill-frame. Integral with the bar or lever $h$, and extending laterally therefrom at its pivot or fulcrum, is a comparatively short arm $h^2$, which is pivotally connected at its free end with the plunger-rod Y. The bar $h$ and its arm $h^2$ form a double bell-crank lever, and in the reciprocation of the rod Y the upper and lower ends of the bar or lever $h$ are oscillated in the vertical plane.

W is a driving medium consisting, preferably, of a link-belt $g$, which passes around the sprocket-wheel E', and is connected at opposite ends by means of strands $g'$ with the opposite ends of the bar $h$.

In operation the upward plunge of the rod Y swings the lever $h$ at its lower end to the left in Fig. 1 and the upper end of said lever to the right, causing the driving medium W, at its chain or link-belt portion $g$, to turn the sprocket-wheel E' and sleeve E in the positive direction. In this movement of the sleeve its friction-surface $n'$ engages the friction-surface $k'$ of the finger $k$ and swings the frame F to the position wherein its finger or dog $m$ engages the ratchet $n^2$. This engagement of the ratchet with the dog causes the dog to lock or grip the head $p$ to the head $n$, whereby the rotation of the sleeve E rotates the sleeve C in the same direction. As the sleeve C rotates, it draws upon the spring D, tending to set or wind the same upon the sleeves, and causing it at its opposite end to draw upon the sleeve C' to rotate the latter and the shaft B. In the downward plunge of the rod Y the movement of the lever $h$ and driving medium W is reversed, causing the chain $g$ to turn the sprocket-wheel E' and sleeve E in the opposite or reverse direction. In this movement the engagement of the friction-surface $n'$ with the finger $k$ turns the frame F and withdraws the stop or dog $m$ out of engagement with the ratchet $n^2$, whereby the sleeve C is released from the sleeve E. The engagement of the dog $p^3$ with the ratchet $p'$ prevents any reverse movement of the sleeve C, so that the spring as it recoils exerts itself against the sleeve C' and shaft B to continue the rotation of the latter. Thus in every upward plunge of the rod Y the sleeve C is driven positively to wind the spring D against its resistance and turn the sleeve C' and shaft B; while in the downward plunge of the rod Y the sleeve C is held against negative rotation and the resilient power or recoil of the spring continues the rotation of the sleeve C' and shaft B. The fly-wheel B' tends also to continue the motion of the shaft B, and the spring and fly-wheel both operate to effect a steady rotation of the shaft under whatever the resistance may be to the said rotation.

Owing to the relative distances at the frame or intermittent grip-lever F between the pivot $m^2$ and gripping-surface $k'$ and between the pivot $m^2$ and the ratchet engaging end of the dog $m$, but very slight movement of the head $n$ in the positive direction will engage the finger $k$ and swing the dog into engagement with the ratchet $n'$. Thus there is no appreciable lost motion between the intermittent grip members. By rendering the sleeves C C' tapering or conical, as described, the spring D has the desired amount of play and can be set only until it is contracted transversely to bear around the sleeves, after which a direct unyielding rotating force is brought to bear against the sleeve C' and shaft. Thus in each operation the tendency of the rotation of the sleeve C will be to first wind up the spring, and when the latter is set to the limit to exert a positive unyielding pull upon the drive-shaft, the inertia of the fly-wheel and recoil of the spring operating to continue the rotation of the shaft when it is released from the driving power under the reverse movement of the sleeve E.

The mill G affords a convenient means for grinding feed or the like, and the hopper X may extend below a bin or hopper, which will give a continuous supply of feed, or the like, to be ground. While the windmill is running, the mill will grind smoothly and no attendant will be required to look after it. When desired, churns or other light-running machinery may be belted to the pulley B².

My improved power-transforming machine forms a very useful and desirable device, especially for farm use, and where a windmill is employed; and, besides producing a comparatively steady and even rotary power from the reciprocating plunger of a windmill, the operation of which is usually more or less unsteady, it may be practically noiseless in its operation. As constructed my improved machine is strong, durable, simple, and comparatively inexpensive to manufacture; and, while I prefer to construct it with all its parts as shown and described, the construction may be modified in the matter of details without departing from the spirit of my invention as defined by the claims.

What I claim as new, and desire to secure by Letters Patent, is—

1. In a power-transforming device, the combination with a rotary shaft, of intermittingly-actuated driving mechanism therefor, and a spring connected at one end with said shaft and engaged at its opposite end by said driving mechanism in one direction of its action, whereby the spring is set by the driving action of the driving mechanism and released by the stoppage or reverse action of said mechanism to continue the driving of the shaft by its recoil, substantially as described.

2. In a power-transforming device, the combination with an intermittent driving medium, of an intermittent grip member driven by said medium, a rotary shaft, a spring connected at one end to the shaft, and a rotary intermittent grip member with which the spring is connected at its opposite end, said rotary member being intermittingly engaged and rotated by the said first member in the movement of the latter in the positive direction, to rotate the shaft through the medium of the spring, substantially as and for the purpose set forth.

3. In a power-transforming device, the combination with an intermittent driving medium, of an intermittent grip member driven by said medium, a rotary shaft, a spring connected at one end to the shaft, a rotary intermittent grip member with which the spring is connected at its opposite end, said rotary member being intermittingly engaged and rotated by the said first member, in the movement of the latter in the positive direction, to rotate the shaft through the medium of the spring, and stop mechanism, at the said rotary member, operating to engage and prevent movement thereof in the reverse direction, substantially as and for the purpose set forth.

4. In a power-transforming device, the combination with an intermittent driving medium, of an intermittent grip member driven by said medium, a rotary shaft, a spring connected at one end to the shaft, a rotary intermittent grip member with which the spring is connected at its opposite end, said rotary member being intermittingly engaged and rotated by the said first member, in the movement of the latter in the positive direction, to rotate the shaft through the medium of the spring, and a fly-wheel on the shaft, substantially as and for the purpose set forth.

5. In a power-transforming device, the combination with the frame and an intermittent driving medium, of an intermittent grip member driven by said medium, a rotary shaft, a spring connected at one end to the shaft, a rotary intermittent grip member with which the spring is connected at its opposite end, said rotary member being intermittingly engaged and rotated by the said first member, in the movement of the latter in the positive direction, to rotate the shaft through the medium of the spring, a grinding-mill mounted upon the frame and provided with a stationary grinding member, and a rotary grinding member on the end of said shaft at said stationary grinding member, substantially as and for the purpose set forth.

6. In a power-transforming device, the combination with a frame and rotary shaft, of intermittingly-acting driving mechanism therefor, a spring connected at one end with said shaft and engaged at its opposite end by said driving mechanism in one direction of its action, whereby the spring is set by the driving action of the driving mechanism and released by the reverse action of said mechanism to continue the driving of the shaft by its recoil, a grinding-mill on the frame having one grinding member on the end of said shaft, and a fly-wheel on said shaft, substantially as and for the purpose set forth.

7. In a power-transforming device, the combination with the frame and an intermittent driving medium, of a rotary shaft journaled in the frame, a sleeve upon said shaft provided with an intermittent grip member, a spring connected at opposite ends respectively to said shaft and sleeve, a driving-wheel, loosely mounted on said sleeve, geared to said intermittent driving medium and carrying a driving intermittent grip member coacting with the first said grip member, whereby power applied to turn said driving-wheel, in one direction, causes the intermittent grip members to engage and turn the sleeve and set the spring and turn the shaft, and the spring, by its recoil, continues the rotation of the shaft, when the intermittent grip members are released from each other by the stoppage or reverse movement of the driving-wheel, substantially as and for the purpose set forth.

8. In a power-transforming device, the combination with the frame and an intermittent driving medium, of a rotary shaft journaled in the frame, two conical sleeves, one fixed to and the other loose upon the shaft, a helical spring extending about both said sleeves and attached thereto at opposite ends respectively, an intermittent grip member on said loose sleeve, a driving-wheel on said loose sleeve connected with said intermittent driving medium and provided with an intermittent grip member coacting with the first-named intermittent grip member, whereby movement of the driving-wheel in one direction will cause the intermittent grip members to engage and turn said loose sleeve to contract the spring about the conical sleeves and rotate the shaft, and in the stoppage or reverse action of said driving-wheel the intermittent grip mechanisms will release each other permitting the spring by its recoil to continue the rotation of the shaft, substantially as and for the purpose set forth.

JAMES E. GOODHUE.

In presence of—
H. J. FROST,
J. H. LEE.